United States Patent
Arya et al.

(10) Patent No.: US 10,789,312 B2
(45) Date of Patent: Sep. 29, 2020

(54) RECOMMENDING RELEVANT POSITIONS

(71) Applicant: Microsoft Technology Licensing, LLC, Redmond, WA (US)

(72) Inventors: Dhruv Arya, Sunnyvale, CA (US); Kevin Kao, San Jose, CA (US); Huichao Xue, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 15/828,915

(22) Filed: Dec. 1, 2017

(65) Prior Publication Data

US 2019/0171764 A1 Jun. 6, 2019

(51) Int. Cl.
*G06F 16/9535* (2019.01)
*G06F 16/9038* (2019.01)
*G06Q 50/00* (2012.01)

(52) U.S. Cl.
CPC ...... *G06F 16/9535* (2019.01); *G06F 16/9038* (2019.01); *G06Q 50/00* (2013.01)

(58) Field of Classification Search
CPC .. G06F 16/9535; G06F 16/9038; G06Q 50/00
USPC ....................................................... 707/722
See application file for complete search history.

(56) References Cited

U.S. PATENT DOCUMENTS

| 2011/0196802 A1* | 8/2011 | Ellis ................ G06Q 10/00 705/321 |
| 2015/0242496 A1* | 8/2015 | Schlesinger ......... G06Q 50/265 707/722 |
| 2015/0356186 A1* | 12/2015 | Konik .................... G06N 7/005 707/706 |
| 2016/0267637 A1* | 9/2016 | Hsiao ............... G06F 16/24578 |
| 2017/0277364 A1* | 9/2017 | Roach ................... G06F 3/017 |
| 2017/0283547 A1* | 10/2017 | Ko ....................... C08K 5/1515 |
| 2018/0218422 A1* | 8/2018 | Gungor ............. G06F 16/9535 |
| 2019/0095531 A1* | 3/2019 | Zhang .................. G06N 20/00 |

OTHER PUBLICATIONS

Borisyuk, et al., "CaSMoS: A Framework for Learning Candidate Selection Models over Structured Queries and Documents", In the 22nd ACM SIGKDD Conference on Knowledge Discovery and Data Mining, Aug. 13, 2016, 10 Pages.

* cited by examiner

*Primary Examiner* — Robert W Beausoliel, Jr.
*Assistant Examiner* — Arthur Ganger
(74) *Attorney, Agent, or Firm* — Schwegman Lundberg & Woessner, P.A.

(57) ABSTRACT

This disclosure relates to systems and methods for recommending relevant positions. A method includes receiving, from a member of an online networking service, a query for one or more available employment positions; executing the query, at a database of employment positions, to retrieve the one or more available employment positions; filtering results of the query according to one or more facets; generating an electronic user interface to display the filtered results; and allowing the member to adjust the facets using the electronic user interface.

17 Claims, 6 Drawing Sheets

FIG. 6

RECOMMENDING RELEVANT POSITIONS

TECHNICAL FIELD

The subject matter disclosed herein generally relates to recommending relevant positions and, more particularly, to filtering query results according to one or more facets of the member seeking an alternative employment position.

BACKGROUND

A common feature of online networking services includes allowing members to search for an alternative employment positions. In certain examples, determining relevant positions among millions of positions and hundreds of millions of members is computationally prohibitive.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody the inventive subject matter. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein is a system configured to identify one or more relevant employment positions for a member of an online social networking system in response to the member requesting available positions.

In one example embodiment, a jobs search engine is configured with multiple searching systems. For example, the jobs search engine includes a narrow condition on a query (e.g., location) first, and then filters the results according to more broad conditions (e.g., title, industry, country, etc.). In this way, the jobs search engine does not apply the broad conditions to the full set of records in the positions database thus saving computational resources.

In another example, the jobs search engine applies query conditions serially by first applying a most narrow condition and then successively applying more broad conditions on results until a threshold number of results remain.

In another example embodiment, a search system ranks results according to member profile attributes (e.g., experience level, current position title, location, etc.), member activity features (e.g., interactions with the online social networking system, articles posted, comments, messages, web site visitations, etc.), and connections (e.g., network connection at the online social networking systems with those who may have posted the employment position).

In one example embodiment, the jobs search engine combines search results from multiple searching systems and scores the results according to the aforementioned features. For example, the jobs search system may score the results and keep the top 1000 results to be ranked in a second ranking phase that more carefully scores and ranks (e.g., uses a longer list of features to score the employment positions).

Searching and ranking potential employment positions for each member of an online networking service that includes millions of members is computationally prohibitive. Furthermore, as membership changes and the available positions change, the jobs search engine cannot maintain a consistent mapping between members and available positions because the rate of change exceeds the computational capabilities of the job search engine.

In another example embodiment, the jobs search engine tokenizes each employment position posting to generate a set of term-value pairs that are stored in an index. The jobs search engine may also use n-grams and span computation as one skilled in the art may appreciate. In this way, each posting is associated (or mapped) to a plurality of indexed terms. Thus, as a searching system queries for employment positions, the system matches terms in a query from a member with indexed terms in the postings. In one example, the searching system returns employment positions that match a higher number of indexed terms.

In other embodiments, the jobs search engine generates a numerical hash for each posting and uses the hash to index the posting. The hash for the posting may also be used to associate the posting with other similar postings (due to the numerical hashes being similar).

However, such a job search engine is not easily modified because changes are usually done in code. Furthermore, as the number of jobs increases to tens of millions of postings, the computational demands cause a significant increase in latency (e.g., as much as a full second).

Another job search system uses a model to represent a member. This job search system builds a model for the type of member one time and the respective search systems are programmed to perform queries using the model. In certain embodiment, a model is configured as a set of attributes that are associated with the member. As with the previous job search system, this job search system uses a multipass ranking where the first pass is a lightweight logistic regression model that narrows the results before passing the results to a more elaborate model.

In one example embodiment, a system unifies the first and the second job search engines. This unified job search engine first uses one or more analyzers to tokenize the position postings and indexes raw fields parsed from the position postings. Furthermore, in another example embodiment, the unified search engine indexes each position postings according to various facets that are later described.

In one example embodiment, a unified job search engine is configured to receive a query from a member of an online networking service, execute the query to retrieve one or more available employment positions, filter results of the query according to one or more facets of the member, display the filtered results to the member, and provide an interface for the user to adjust the facets. Instead of using member facets to rank or score search results, the unified job search engine uses the member facets to limit the search results as described herein. In one example embodiment, a unified job search engine is incorporated into a position recommendation system (e.g., position recommendation system 150 of FIG. 1).

Figure 1:
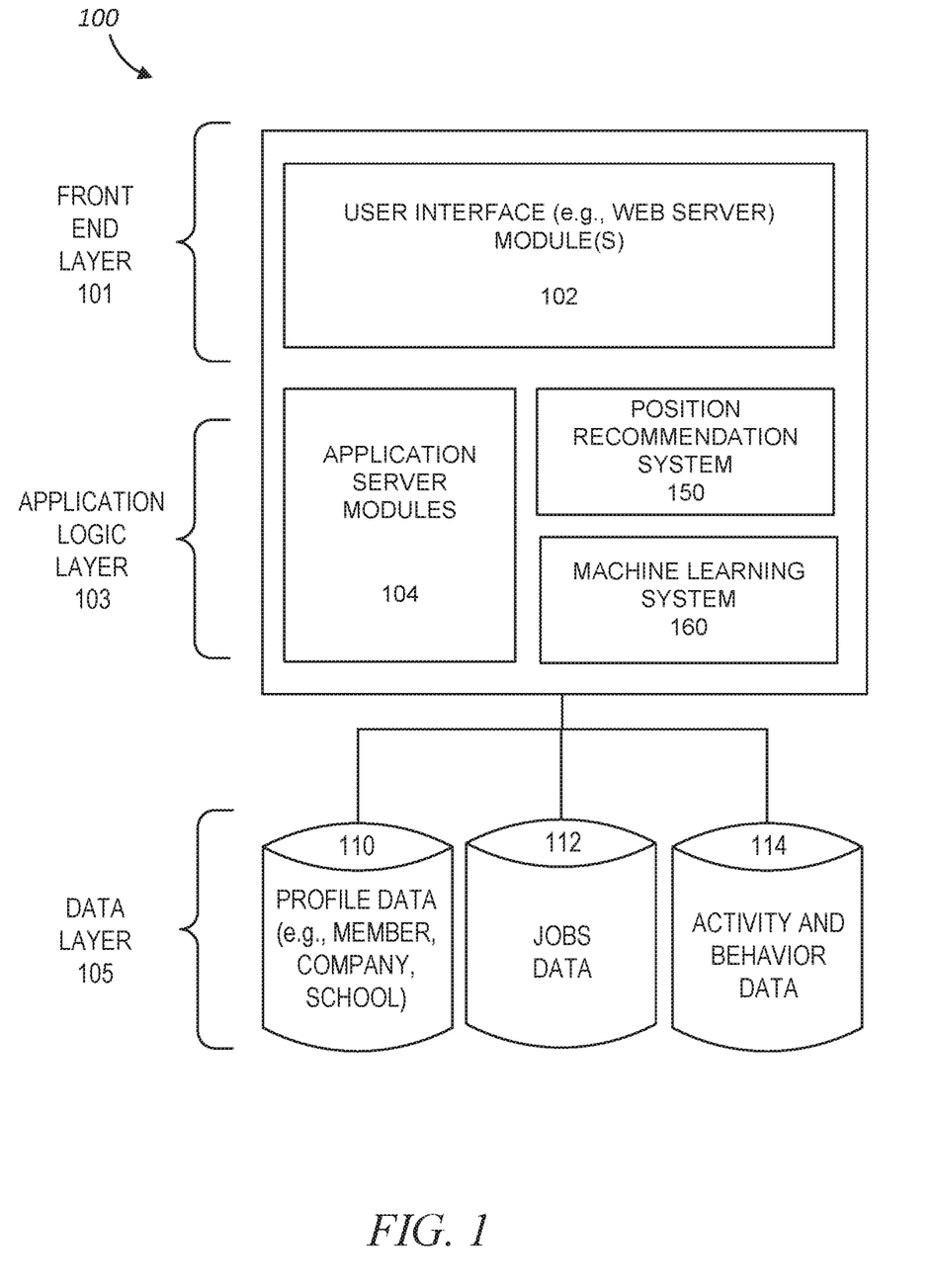
FIG. 1 is a block diagram illustrating various components or functional modules of an online networking service, in an example embodiment.

FIG. 1 is a block diagram illustrating various components or functional modules of an online networking service 100, in an example embodiment. In one example, the online networking service 100 includes a position recommendation system 150 that performs many of the operations described herein and a machine learning system 160.

A front end layer 101 consists of one or more user interface modules (e.g., a web server) 102, which receive requests from various client computing devices and communicate appropriate responses to the requesting client devices. For example, the user interface module(s) 102 may receive requests in the form of Hypertext Transfer Protocol (HTTP) requests, or other web-based application programming interface (API) requests. In another example, the front end layer 101 receives requests from an application executing via a member's mobile computing device. In one example embodiment, the member requests a list of available employment positions using the application, and the application transmits an indicator, indicating the member's desire to view alternative positions, to the position recommendation system 150. As described herein, the position recommendation system 150 identifies a set of employment positions that are relevant to the member and transmits them to the member's mobile computing device or other device being used by the member.

An application logic layer 103 includes various application server modules 104, which, in conjunction with the user interface module(s) 102, may generate various user interfaces (e.g., web pages, applications, etc.) with data retrieved from various data sources in a data layer 105. In one example embodiment, the application logic layer 103 includes the position recommendation system 150 and the machine learning system 160.

In some examples, individual application server modules 104 may be used to implement the functionality associated with various services and features of the online networking service 100. For instance, the ability of an organization to establish a presence in the social graph of the online networking service 100, including the ability to establish a customized web page on behalf of an organization, post available employment positions, and to publish messages or status updates on behalf of an organization, may be a service implemented in independent application server modules 104. Similarly, a variety of other applications or services that are made available to members of the online networking service 100 may be embodied in their own application server modules 104. Alternatively, various applications may be embodied in a single application server module 104.

As illustrated, the data layer 105 includes, but is not necessarily limited to, several databases 110, 112, 114, such as a database 110 for storing profile data, including both member profile data and profile data for various organizations, name cluster data, member interactions, member queries, or the like. Database 112 is configured to store employment position postings, posting indices, or the like. In another example embodiment, the database 114 stores member activity and behavior data used to determine a member's inclination metric as described herein. In certain examples, the position recommendation system 150 retrieves available employment positions that are relevant to certain members by selecting records stored in the database 112.

Consistent with some examples, when a person initially registers to become a member of the online networking service 100, the person may be prompted to provide some personal information, such as his or her name, age (e.g., birthdate), gender, sexual orientation, interests, hobbies, contact information, home town, address, spouse's and/or family members' names, educational background (e.g., schools, majors, matriculation and/or graduation dates, etc.), occupation, employment history, skills, religion, professional organizations, and other properties and/or characteristics of the member. In one example embodiment, the online networking service 100 asks whether the member desires to participate in a program that implements the position recommendation system 150. This information is stored, for example, in the database 110. Similarly, when a representative of an organization initially registers the organization with the online networking service 100, the representative may be prompted to provide certain information about the organization. This information may be stored, for example, in the database 110, or another database (not shown).

The online networking service 100 may provide a broad range of other applications and services that allow members the opportunity to share and receive information, which is often customized to the interests of the member. For example, in some examples, the online networking service 100 may include a message sharing application that allows members to upload and share messages with other members. In some examples, members may be able to self-organize into groups, or interest groups, organized around a subject matter or topic of interest. In some examples, the online networking service 100 may host various job listings providing details of job openings within various organizations.

As members interact with the various applications, services, and content made available via the online networking service 100, information concerning content items interacted with, such as by viewing, playing, and the like, may be monitored, and information concerning the interactions may be stored, for example, as indicated in FIG. 1 by the database 114. In certain example embodiments, the database 114 stores member interactions such as, but not limited to, viewing received messages, clicking a link in a received message, updating a member profile, updating a specific parameter of a member profile, setting a profile indicator, using a specific term in the member profile, searching for alternative roles, reviewing job postings (e.g., available employment positions), requesting to receive notification of alternative roles, or other actions or interactions with the online networking service 100 that indicate an inclination to modify a current role for the member.

Although not shown, in some examples, the online networking service 100 provides an API module via which third-party applications can access various services and data provided by the online networking service 100. For example, using an API, a third-party application may provide a user interface and logic that enables the member to submit and/or configure a set of rules used by the position recommendation system 150. Such third-party applications may be browser-based applications or may be operating system specific. In particular, some third-party applications may reside and execute on one or more mobile devices (e.g., phones or tablet computing devices) having a mobile operating system.

Figure 2:
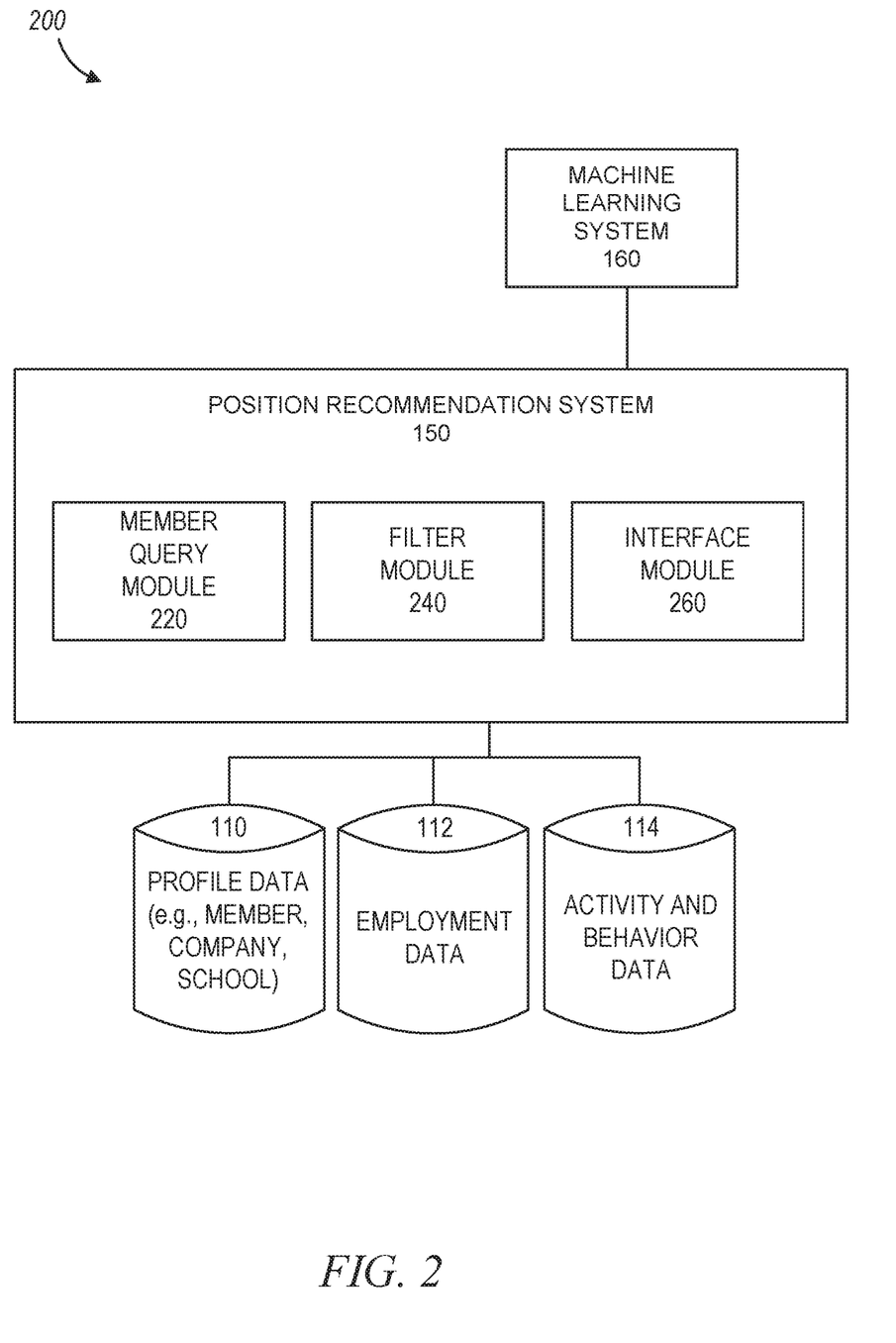
FIG. 2 is a block diagram illustrating a system for recommending relevant positions, according to one example embodiment.

FIG. 2 is a block diagram illustrating a system 200 for recommending relevant positions, according to one example embodiment. In this example embodiment, the system 200 includes the machine learning system 160, the position recommendation system 150, and the databases 110, 112, and 114. The position recommendation system 150 includes a member query module 220, a filter module 240, and an interface module 260.

In one example embodiment, the member query module 220 is configured to receive a query from a member of an online networking service. As one skilled in the art may appreciate, the member query module 220 may receive the query in many different ways. In certain examples, the member query module 220 provides a user interface using the user interface module 102. For example, the member query module 220 may generate a web page for accepting the query and transmit the web page to a computing device being used by the member. In another example, the member query module 220 instructs an application executing at the computing device for the member to display a user interface to the member.

In other example embodiments, the user interface is configured to include a variety of user interface controls to assist the member in generating the query. In one example, the user interface may allow the member to select one or more fields to be included in the query. In one specific example, the position recommendation system 150 presents a page to the member, wherein, when the member visits the page, a query is formed to search for available employment positions.

In another example embodiment, the member query module 220 executes the query to retrieve one or more available employment positions that have been posted to the social networking service. For example, the member query module 220 may submit the query to the database 112.

In response to a posting for an employment position being posted to the online networking service 100, in one example embodiment, the member query module 220 parses the posting to identify specific fields (e.g., specific terms, inferred fields, etc.) that are included in the posting. The member query module 220 may then apply tags to the posting. In this way, the position recommendation system 150 may more quickly identify positions that match query parameters because the member query module 220 identifies fields stored in a key/value pair instead of searching the posting for relevant fields. Of course, as one skilled in the art may appreciate, the member query module 220 parses the posting according to a language of the posting.

In another example embodiment, the member query module 220 retrieves parameters associated with the member (e.g., from the database 110) and includes them in the query. Thus, the member query module 220 may provide a query (include one or more parameters associated with the member that may return more relevant results for the member). In one non-limiting example, the member query module 220 may inspect a profile for the member to determine where the member is located and include the location of the member in the query although the member did not specifically request inclusion of the location. Other fields include, but are not limited to, experience level, specific skills, employment preference, special accommodations, gender, religion, and the like.

In one example embodiment, the member query module 220 configures a batch system to segment members according to their profile parameters. Thus, the member query module 220 may include parameters for the segment instead of individual parameters for each member. Another parameter that may be included in such a query is the member's activity level (e.g., a number of interactions with the online networking service 100 per unit time including comments, posts, likes, requests, web page loads, selections, or the like).

In a specific example, a member may search for employment positions titled "software engineer at GOOGLE™." The member query module 220 parses the query to determine that the position is a "software engineer" and the employer is "GOOGLE™." The member query module may then enhance the query by including some profile parameters from the member or from a segment of members that the member belongs to. In one example, the member query module 220 may include the member's location or experience level with the query so as to restrict results of the query without the member having to explicitly do so.

In one example embodiment, the filter module 240 is configured to filter results of the query according to one or more facets of the member. As described herein, a facet of the member includes, but is not limited to, a particular feature or aspect of the member, the posting, or a combination of the two, that may be used to filter (e.g., disqualify some) results of the query. In another embodiment, the facet describes a unique correlation between the member and the posting.

In certain embodiments, a facet includes at least one of the following:

1. The member being alumni from the same educational institution of the member that posted the employment position.

2. The member having attended the same educational institution of the member that posted the employment position.

3. The member having lived at a location where an employment position is located.

4. A member being connected at the online networking service 100 to the member that posted the employment position.

5. The member having identified a skill that is needed to gain to apply for the employment position.

6. The member being connected at the online networking service 100 to another member that is employed by the entity offering the employment position.

7. The member being a "top" applicant (for example, in the case where the member's unique set of qualification and experience most closely match those identified by the posting for the employment position).

8. The member having previously indicated to "follow" the entity that is offering the employment position.

9. Previous employees of an entity where the member is currently employed being currently employed by the entity that is offering the employment position.

10. The member being one of the first threshold number of applicants for an open employment position. In one specific example, the threshold number of applicants is 10; however, one skilled in the art may recognize other threshold values and this disclosure is not limited in this regard.

11. The member having a specific amount of experience that is requested by a posting for the employment position (e.g., 6 months).

12. The professional qualifications of the member placing the member in a top threshold percentage of current applicants (for example, where the member's qualifications place the member in the top 10% of applicants). Of course, other values may be used.

13. The entity that is offering the position having hired a large percentage (e.g., more than 20%) of their employees in the past year (or another threshold percentage in a previous period of time).

14. How the member came to a page the displays the set of employment positions (e.g., a web link, a universal resource locator located in an email, or the like).

15. A textual correlation between a title of the current position the member holds and the title of the posting.

16. Entity name offering the position.

17. Skill set requested before applying for the position.

18. Position posted by a member having a second-degree connection with the member looking for an available position.

19. Position is by an entity that is similar (e.g., in the same industry) as one that is currently employing the member.

20. A title of a position the member previously applied to.

21. A position that matched a previous search submitted by the member.

In another example embodiment, the facets are selected from a predetermined set of facets. For example, an administrator of the online networking service 100 may define the predetermined set of facets and the filter module 240 may filter results of the query using one or more of the facets.

In another example embodiment, the filter module 240 applies a machine learning system to learn a set of facets. In one example, as members of the online networking service apply for and accept available employment positions, the filter module 240 combines the facets of the member and the employment position as training data for the machine learning system 160. The filter module 240 then trains the machine learning system 160 on the training data. In this example, the output of the machine learning system 160 is a set of facets to be used for a member.

In one example embodiment, the filter module 240 trains separate machine learning systems 160 on each segment of like members. Thus, in one example, the filter module 240 may train a machine learning system (e.g., a neural network, or the like) for software engineers with less than 3 years experience residing in San Jose, Calif.

In another example embodiment, the filter module 240 applies a coarse filter to the results of the query. As one skilled in the art may appreciate, applying a coarse filter may significantly reduce the set of results in a computationally inexpensive way. In one example, including specific skills needed to apply for the position as a filtering parameter may be a coarse filter because it efficiently (e.g., computationally inexpensive) removes positions from the set of results that are not relevant (e.g., the member does not have the skills or experience needed for this position).

After applying a coarse filter, the filter module 240, in one example embodiment, applies a fine filter to the remaining results. A fine filter at least includes applying several other facets to be used in filtering that is computationally expensive. For example, restricting results that satisfy five other facets is more computationally expensive because it requires analysis of more facets. By applying a coarse filter before applying a fine filter, the filter module 240 reduces the set of results in a computationally efficient manner. In one example of an SQL query, the coarse filter includes a condition (e.g., an additional "where" clause) that significantly limits results of the query.

In another example embodiment, the filter module 240 applies facets separately. For example, the filter module 240 applies a first facet resulting in a first set of results, a second facet resulting in a second set of results, and so on. The filter module 240 then identifies results that are common between multiple different sets of results. For example, where a particular posting is found in results from two or more sets, the filter module includes the particular posting in a final results set.

In another example embodiment, the filter module 240 ranks results in the final results set according to how many sets of results (from individual facets) the employment opportunity postings are found. For example, where a posting is found in three different sets of results while other postings are not found in more than two, the first posting is ranked first because it is found in more results sets than the other postings. In this way, the filter module 240 filters results from the query according to a commonality of results for each of the facets.

In one example embodiment, the interface module 260 is configured to display the filtered results to the member. In certain examples, the interface module 260 generates code for a web page the displays the results and transmits the code to a computing device being used by the member.

In another example embodiment, the interface module 260 transmits data to the computing device being used by the member where the data comprises sufficient information to direct generation of a display at the computing device. In one example, the sufficient information includes one or more buttons with their associated locations and/or functionality.

In one example embodiment, the interface module 260 provides an interface to the member allowing the member to adjust the facets. In one example, the interface module 260 displays the facets used by the filter module 240 allowing the member to select and/or deselect the respective facets.

In another example embodiment, the interface module 260 updates the results being displayed according to adjustments made by the member. For example, in response to the member adding a facet to restrict the results, the filter module 240 updates the results according to the added facet, and the interface module 260 updates the results being displayed.

Figure 3:
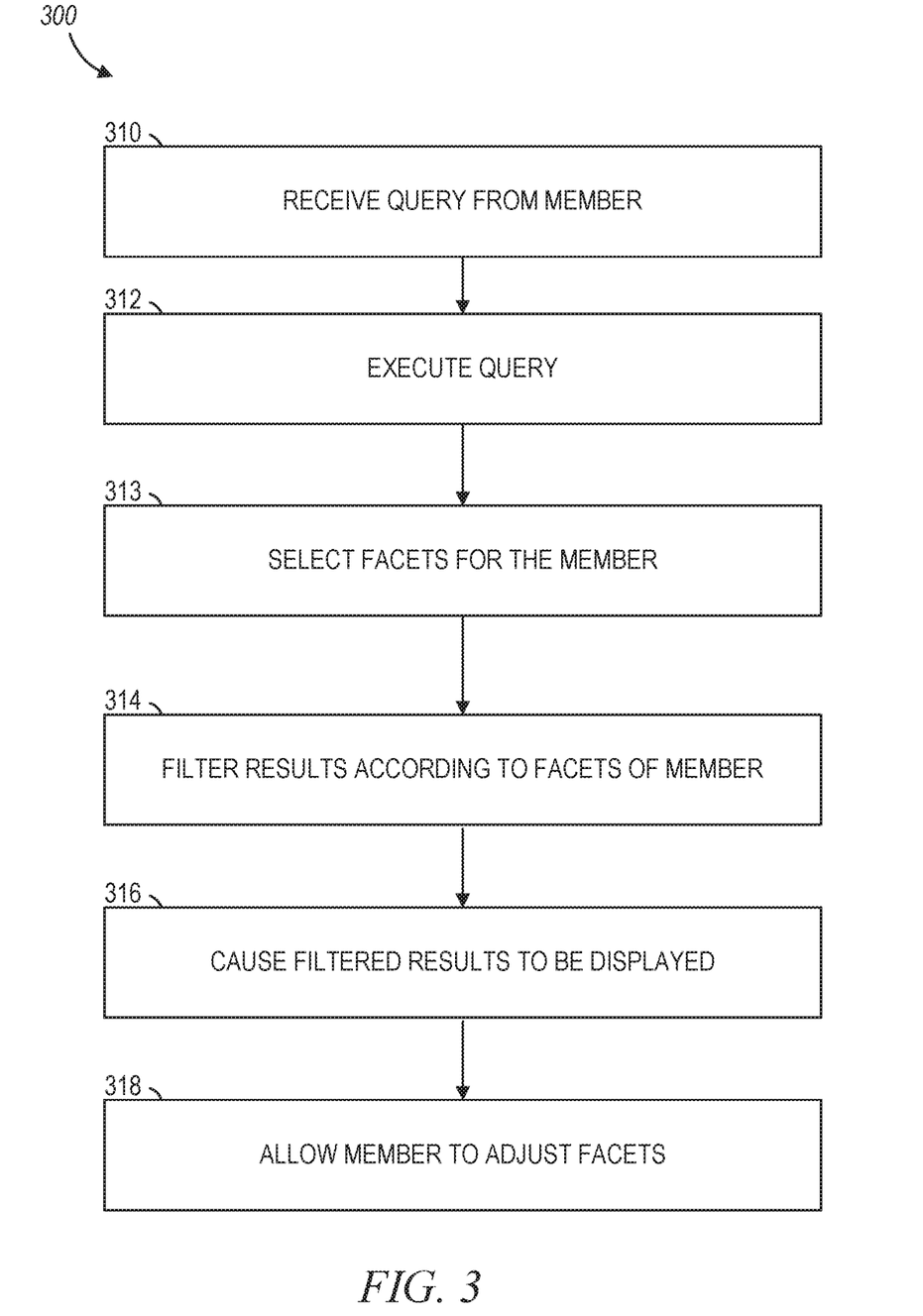
FIG. 3 is a flow chart diagram illustrating a method for recommending relevant positions, according to one example embodiment.

FIG. 3 is a flow chart diagram illustrating a method for recommending relevant positions, according to one example embodiment. Operations in the method 300 are performed by one or more modules described in FIG. 2 and are indicated by reference thereto.

In one example embodiment, the method 300 begins at operation 310 and the member query module 220 receives, from a member of the online networking service 100, a query for one or more available employment positions. For example, the member might manipulate a graphical user interface to configure a query, and the member query module 220 receives the query. In another example, the member query module 220 enters a set of terms for the query in a text input control.

The method 300 continues at operation 312 and the member query module 220 executes the query, at a database of employment positions, to retrieve the one or more available positions. In one example, the member query module 220 formulates an SQL query and submits the query to the database 112.

The method 300 continues at operation 313 and the member query module 220 selects one or more facets from a set of predetermined facets. For example, the member query module 220 applies facets sequentially until a threshold number of results remain in the filtered set of results after operation 314.

The method 300 continues at operation 314 and the filter module 240 filters the results of the query according to one or more facets. In one example, the filter module 240 limits employment positions from the set of results wherein the member is not connected with the member that posted the employment position. The filter module 240 may apply any of the other facets described herein.

In one example embodiment, the filter module 240 applies facets until a threshold number of results remain in the filtered results set. For example, the filter module 240 may apply a first facet. In response to there being more than 100 results remaining, the filter module 240 applies a second facet. The filter module 240 may continue applying facets until the number of positions remaining is below a threshold number. In another example embodiment, the filter module 240 retrieves a set of facets from an administrator.

The method 300 continues at operation 316 and the interface module 260 generates an electronic interface to display the filtered results. In one example, the interface module 260 generates a web page that displays the remaining positions and transmits the web page to a computing device being used by the member. In another example embodiment, the interface module 260 transmits the results to an application executing on the computing device being used by the member.

The method 300 continues at operation 318 and the interface module 260 allows the member to adjust the facets using the electronic user interface. For example, the interface module 260 generates a web page that displays each facet as a selectable button. In this example, selecting the button either selects or de-selects the facet for inclusion in the query. In another example embodiment, the operation 318 includes causing the user interface to allow the member to adjust facets applied to the query results.

Figure 4:
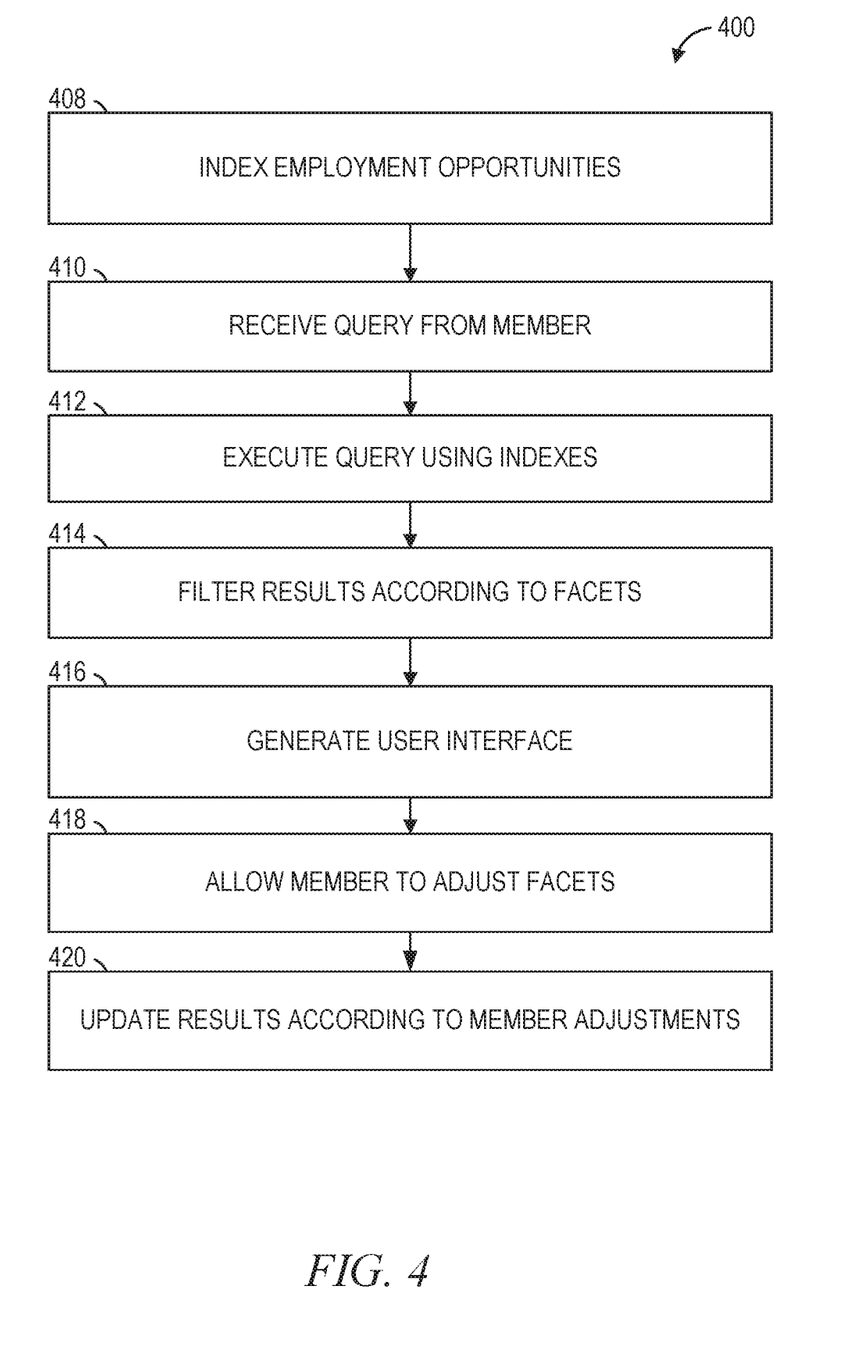
FIG. 4 is a flow chart diagram illustrating another method of recommending relevant positions, according to one example embodiment.

FIG. 4 is a flow chart diagram illustrating another method 400 of recommending relevant positions, according to one example embodiment. Operations in the method 400 are performed by one or more modules described in FIG. 2 and are indicated by reference thereto.

In one example embodiment, the method 400 begins and at operation 408 the member query module 220 indexes available employment positions. As previously described, the member query module 220 may tokenize each posting to determine aspects of the position including, but not limited to, position title, position compensation, position requirements, position hiring entity, position qualifications, position location, position work schedule, position term, or the like. The member query module 220 may also determine which of a set of fields are included in the position and update an index for the available positions accordingly.

In another example embodiment, the member query module 220 updates an index of available positions when a position posting is received by tokenizing the posting and updating the index.

In one example embodiment, the method 400 continues at operation 410 and the member query module 220 receives, from a member of the online networking service 100, a query for one or more available positions. For example, the member might manipulate a graphical user interface to configure a query at a computing device for the member, and the computing device transmits the query to the member query module 220.

The method 400 continues at operation 412 and the member query module 220 executes the query, at a database of employment positions, to retrieve the one or more available positions.

The method 400 continues at operation 414 and the filter module 240 filters the results of the query according to one or more facets. In one example, the filter module 240 limits employment positions from the set of results wherein the entity that is offering the position has hired a large percentage of their employees in the past 6 months.

The method 400 continues at operation 416 and the interface module 260 generates an electronic interface to display the filtered results. In one example, the interface module 260 generates a web page that displays the remaining positions and transmits the web page to a computing device being used by the member. In another example embodiment, the interface module 260 transmits the results to an application executing on the computing device being used by the member.

The method 400 continues at operation 418 and the interface module 260 allows the member to adjust the facets using the electronic user interface. For example, the interface module 260 generates a web page that displays each facet in a drop-down box. Of course, one skilled in the art may understand many other ways to provide an interface allowing a member to select one or more facets and this disclosure is not limited in this regard.

The method 400 continues at operation 420 and the interface module 260 updates the filtered results being displayed according to the adjustments made by the member.

In another example embodiment of the method 400, the filter module 240 filters results by applying a coarse filter as described herein, then applies a fine filter to results of the coarse filter to generate the filtered results.

Figure 5:
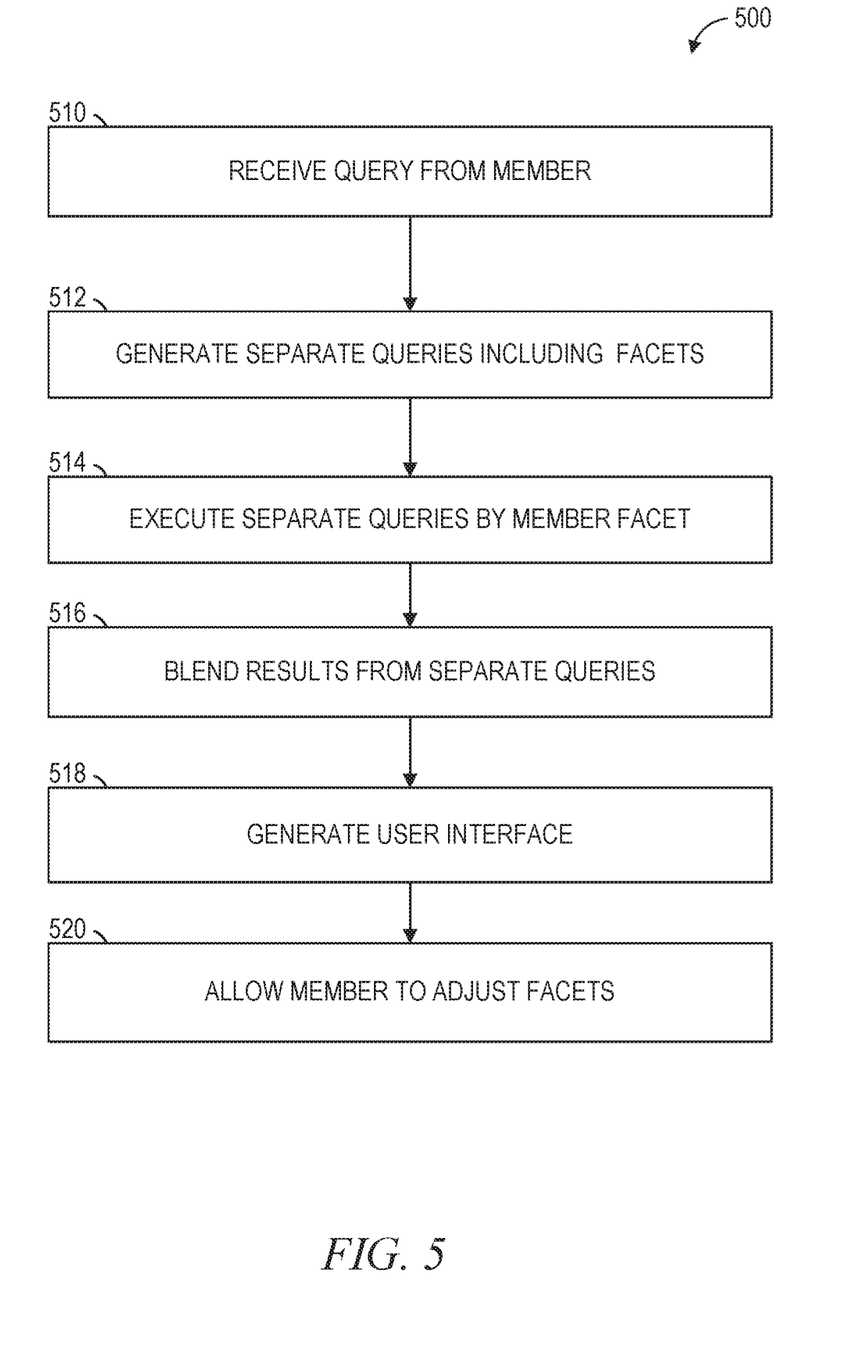
FIG. 5 is a flow chart diagram illustrating a method of recommending relevant positions, according to another example embodiment.

FIG. 5 is a flow chart diagram illustrating a method 500 of recommending relevant positions, according to another example embodiment. Operations in the method 500 are performed by one or more modules described in FIG. 2 and are indicated by reference thereto.

In one example embodiment, the method 500 begins at operation 510 and the member query module 220 receives, from a member of the online networking service 100, a query for one or more available positions.

The method 500 continues at operation 512 and the member query module 220 generates separate queries for a set of facets. In one example, the member query module adds each of the first five facets to five separate queries resulting in the member query plus the first facet in a first query, the member query plus the second facet in a second query, and so forth.

The method 500 continues at operation 514 and the member query module 220 executes each of the queries, at a database of employment positions, to retrieve the one or more available positions for each member query and facet combination. In one example, the member query module 220 formulates an SQL query and submits the query to the database 112. In other embodiments, separate databases are configured to support separate facets and the member query module 220 executes the separate queries at the corresponding databases. For example, one database may be configured to support whether the member is in a top percentage of candidates. In response to the member query module 220 including that facet in the query, then that particular query may be sent to that particular database.

The method 500 continues at operation 516 and the filter module 240 blends results from the separate queries. In one example, the filter module 240 filters out results that are not found in each of the separate queries. In another example, the filter module 240 filters out results that are not found in two or more of the queries.

The method 500 continues at operation 518 and the interface module 260 generates an electronic interface to display the filtered (e.g. blended) results. In one example, the interface module 260 generates a web page that displays the remaining positions and transmits the web page to a computing device being used by the member.

The method 300 continues at operation 520 and the interface module 260 allows the member to adjust the facets using the electronic user interface. For example, the interface module 260 generates a web page that displays each facet as a selectable button. In this example, selecting the button either selects or de-selects the facet. In this particular example, in response to the member selecting facets that were not included in the queries at operation 514, the member query module 220 regenerates a query for the added facet and blends the results as in operation 516.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-5 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 6:
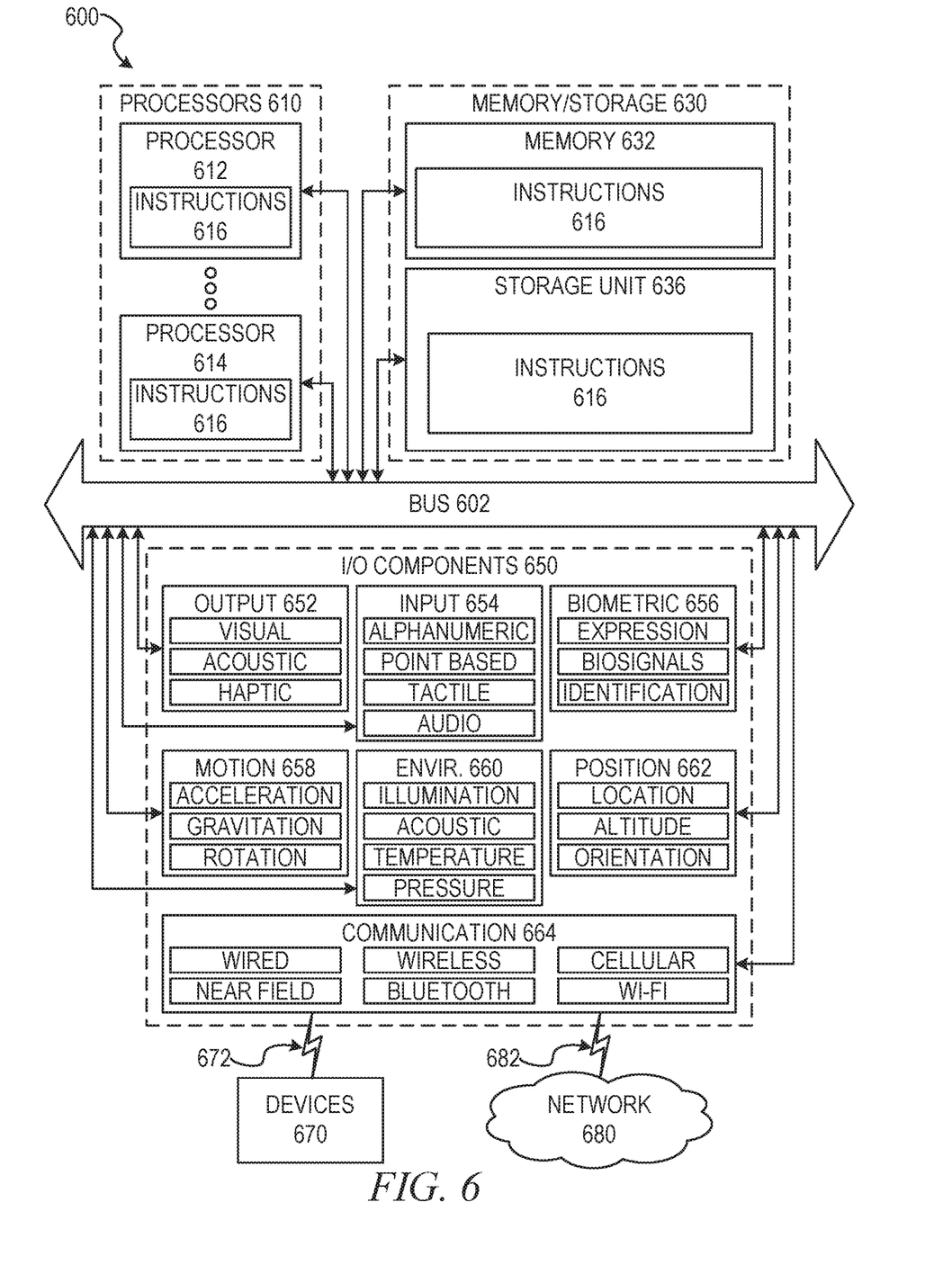
FIG. 6 is a block diagram illustrating components of a machine, according to some example embodiments, able to read instructions from a machine-readable medium (e.g., a hardware machine-readable storage medium) and perform any one or more of the methodologies discussed herein.

FIG. 6 is a block diagram illustrating components of a machine, according to some example embodiments, able to read instructions from a machine-readable medium (e.g., a machine-readable storage medium) and perform any one or more of the methodologies discussed herein.

Specifically, FIG. 6 shows a diagrammatic representation of a machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the flow diagrams of FIGS. 3-5. Additionally, or alternatively, the instructions 616 may implement one or more of the components of FIG. 2. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and input/output (I/O) components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672, respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a machine-readable medium having instructions stored thereon, which, when executed by a processor, cause the processor to perform operations comprising:
    receiving a query from a member of an online networking service;
    execute the query to retrieve one or more available employment positions as query results;
    selecting, without user intervention, one or more facets to filter the query results;
    integrating, without user intervention, the selected facets in separate queries resulting in separate sets of results for each query of the separate queries;
    filtering the sets of results according to a commonality of results between the separate queries and the query results;
    ranking the filtered results such that a first result of the filtered results is ranked higher than a second result of the filtered results that is present in fewer of the sets of results than the first result;
    causing, after the filtering and ranking, the filtered and ranked results to be displayed to the member in an electronic user interface; and
    causing the user interface to allow the member to adjust facets applied to the query results.

2. The system of claim 1, wherein the operations further comprise updating the results according to one or more facet adjustments made by the member.

3. The system of claim 1, wherein the filtering comprises applying a coarse filter to the query results resulting in coarse results and applying a fine filter to the coarse results to generate the filtered results.

4. The system of claim 1, wherein the facets are selected from a predetermined set of facets.

5. The system of claim 1, wherein the operations further comprise applying a machine learning system to learn a set of facets to be used in the filtering.

6. The system of claim 1, wherein the operations further comprise indexing each of the available employment positions according to a default set of fields.

7. A method comprising:
    receiving a query from a member of an online networking service;
    execute the query to retrieve one or more available employment positions as query results;
    selecting, without user intervention, one or more facets to filter the query results;
    integrating, without user intervention, the selected facets in separate queries resulting in separate sets of results for each query of the separate queries;
    filtering the sets of results according to a commonality of results for each of the separate queries;
    ranking the filtered results such that a first result of the filtered results is ranked higher than a second result of the filtered results that is present in fewer of the sets of results than the first result;
    causing, after the filtering and ranking, the filtered and ranked results to be displayed to the member in an electronic user interface; and
    causing the user interface to allow the member to adjust facets applied to the query results.

8. The method of claim 7, wherein the operations further comprise updating the results according to one or more facet adjustments made by the member.

9. The method of claim 7, wherein the filtering comprises applying a coarse filter to the query results resulting in coarse results and applying a fine filter to the coarse results to generate the filtered results.

10. The method of claim 7, wherein the facets are selected from a predetermined set of facets.

11. The method of claim 7, further comprising applying a machine learning system to learn a set of facets to be used in the filtering.

12. The method of claim 7, further comprise indexing each of the available employment positions according to a default set of fields.

13. A non-transitory machine-readable hardware medium having instructions stored thereon, which, when executed by a processor, cause the processor to perform:
    receiving a query from a member of an online networking service;
    execute the query to retrieve one or more available employment positions as query results;
    selecting, without user intervention, one or more facets to filter the query results;
    integrating, without user intervention, the selected facets in separate queries resulting in separate sets of results for each query of the separate queries;
    filtering the sets of results according to a commonality of results for each of the separate queries;
    ranking the filtered results such that a first result of the filtered results is ranked higher than a second result of the filtered results that is present in fewer of the sets of results than the first result;

causing, after the filtering and ranking, the filtered and ranked results to be displayed to the member in an electronic user interface; and causing the user interface to allow the member to adjust facets applied to the query results.

14. The non-transitory machine-readable medium of claim 13, wherein the instructions further comprise updating the results according to one or more facet adjustments made by the member.

15. The non-transitory machine-readable medium of claim 13, wherein the filtering comprises applying a coarse filter to the query results resulting in coarse results and applying a fine filter to the coarse results to generate the filtered results.

16. The non-transitory machine-readable medium of claim 13, wherein the facets are selected from a predetermined set of facets.

17. The non-transitory machine-readable medium of claim 13, further comprising applying a machine learning system to learn a set of facets to be used in the filtering.

* * * * *